UNITED STATES PATENT OFFICE 2,263,598

INTERPOLYMERIZATION PRODUCT OF VINYL ACETATE AND CROTONIC ACID

Werner Starck, Hofheim, Taunus, and Kurt Billig, Frankfort-on-the-Main-Hochst, Germany, assignors, by mesne assignments, to General Aniline & Film Corporation, New York, N. Y., a corporation of Delaware No Drawing. Application April 22, 1938, Serial No. 203,608. In Germany April 29, 1937

1 Claim. (Cl. 260—86)

The present invention relates to interpolymerization products.

Numerous compounds are known which have the property that, under certain conditions they become transformed into their polymeric form. The essential condition for this property is nearly always the presence of a double bond, particularly a double bond of carbon to carbon; most of the compounds capable of being polymerized are, therefore, of an olefinic nature.

A great difference, however, exists between the various olefinic bodies with regard to the degree of the polymerization which they suffer; in most cases a small tendency to polymerize is combined with an incapacity for forming polymerization products of a high molecular weight, and a high tendency to polymerize with a capacity for forming polymerization products of a large molecule.

To the last named group belong the monomeric substances which contain the vinyl group $$CH_2=CH-$$

and in which this group is connected with a negative residue as is the case in vinyl acetate, vinyl chloride, or styrene, or in which this group is conjugated with a second olefinic group as in the case of the dienes. This kind of compound can very readily be polymerized (on receiving a slight impulse, caused for instance by traces of a peroxide) so as to obtain bodies of a high molecular weight, whereas olefines which do not contain the said groups polymerize nearly always only very slowly and only with the aid of catalysts of a strong action, such as $AlCl_3$, $SnCl_4$, $BF_3$, $ZnCl_2$ or $H_2SO_4$. Finally there exist compounds which in spite of their unsaturated nature cannot be polymerized. In this last class of compounds had to be included hitherto crotonic acid and the derivatives thereof, because from these monomeric products no polymerization products had been made which possess the properties of substances of high molecular weight.

Now we have found that crotonic acid as well as the derivatives thereof, such as the esters and nitriles, are capable of forming interpolymerization products with vinyl esters; these products have the properties of valuable bodies of high molecular weight, such as polyvinyl esters themselves; moreover, they improved in nearly all cases the properties of the polyvinyl esters themselves with regard to their industrial value.

The present invention quite generally relates to new and valuable interpolymerization products which may be obtained by polymerizing a mixture of a vinyl ester of an organic caboxylic acid with a compound of the following formula:

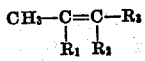

wherein $R_1$ and $R_2$ stand for a substituent of the group consisting of hydrogen, methyl and chlorine and $R_3$ stands for a substituent of the group consisting of —COOH, —COO-alkyl, —COCl, —CONH_2, —C≡N.

It is surprising that crotonic acid and its derivatives are capable of being built into the molecule of a highly polymeric product; it is, however, still more surprising that the properties of the interpolymerization products obtained are not inferior, as might be expected, but are superior to those of the polyvinyl esters themselves. For instance the softening point of the interpolymerization product of vinyl acetate and crotonic acid ester is not decreased, as compared with that of polymerized vinyl acetate, but increased, that is, the resistance to heat is improved. Furthermore the interpolymerization product is more resistant to water and atmospheric conditions than is the polymerization product from vinyl acetate alone. The present process involves the great advantage that the polymerization product is always a complete interpolymerization product for none other than the interpolymerization products can be formed; whereas, in the case of interpolymerization products of two components each of which can be polymerized alone, uniformity of product cannot be obtained unless the most favorable conditions are carefully observed, or even then.

When comparing, the bodies named with the isomeric methacrylic acid and its derivatives, it is evident that in this case the polymerizing power could not be foreseen. The two acids are merely distinguished from each other by the position of the methyl group which in one case stands in alpha-position and in the other case in beta-position to the carboxyl group. When similarly treated methacrylic acid and its derivatives form polymerization products, while crotonic acid and its derivatives do not and have therefore been regarded as incapable of polymerization.

The polymerization is performed by the known methods of polymerizing particularly those applied to vinyl esters. There may be present a solvent or an indifferent diluent; the polymerization may also occur in an emulsion. In order to accelerate the reaction heat or light may be used as well as a catalyst, for instance a peroxide. It is suitable to apply less than about 1 mol of crotonic acid or the derivative thereof per about 1 mol of the readily polymerizing ester.

As vinyl esters of organic carboxylic acids there may be used: vinyl formate, vinyl acetate, vinyl propionate, vinyl butyrate, vinyl chloracetate, vinyl butoxyacetate, vinyl stearate. As the other component there may be applied: crotonic acid, crotonic acid nitrile, crotonic acid ethyl ester, crotonic acid methyl ester, crotonic acid propyl ester, beta-chlorcrotonic acid, beta-chlorcrotonic acid nitrile, beta-chlorcrotonic acid methyl ester, beta-chlorcrotonic acid ethyl ester, beta-chlorcrotonic acid propyl ester, alpha-methylcrotonic acid, alpha-methylcrotonic acid nitrile, alpha-methylcrotonic acid methyl ester, alpha-methylcrotonic acid ethyl ester, alpha-methylcrotonic acid propyl ester, beta-methylcrotonic acid, beta-methylcrotonic acid nitrile, beta-methylcrotonic acid methyl ester, beta-methylcrotonic acid ethyl ester, beta-methylcrotonic acid propyl ester, as well as the chlorides and amides of all the acids named.

There may likewise be polymerized two of the vinyl esters named above in mixture with the crotonic acid or one of the derivatives thereof named above.

As already stated the process is particularly valuable because by its use the properties of the polymeric vinyl esters may be improved and this in many respects could not be foreseen, so that the invention places at the industry's disposal a number of valuable raw materials for lacquers, artificial substances and others having new properties.

The following examples serve to illustrate the invention but they are not intended to limit it thereto, the parts are by weight:

(1) 0.5 part of benzoyl peroxide is dissolved in a mixture of 90 parts of vinyl acetate and 10 parts of crotonic acid methyl ester. The solution is heated to boiling in a reflux apparatus. The mass polymerizes and forms a block which is clear as glass and of a great hardness. The sticky point of the products lies about 15° C. higher than that of a polyvinyl acetate made under the same conditions. The product is soluble in alcohols, benzene hydrocarbons, esters and other organic solvents. It is suitable among other applications, as material for making lacquers.

(2) A mixture of 95 parts of vinyl acetate and 5 parts of crotonic acid ethyl ester to which 0.5 part of distearyl peroxide and 0.05 part of benzoyl peroxide have been added as accelerator, is heated to boiling in a reflux apparatus. The process is suitably performed as follows: a small quantity of the mixture is introduced first and after the polymerization has set in the rest is slowly caused to run in. After the reaction is complete, the polymerization product is further heated for 12 hours at 90° C. There is obtained a colorless polymerization product of a very high viscosity. The films prepared from the solution have a very high resistance to water.

(3) A solution of 80 parts of vinyl formate, 20 parts of crotonic acid nitrile and 0.75 part of benzoyl peroxide in 100 parts of methylene chloride is heated to boiling in a reflux apparatus, while stirring. After 24 hours the polymerization is complete. There is obtained a viscous solution from which the resin may be obtained if necessary by distillation with steam. On the other hand the viscous solution may directly be used as a lacquer with or without the addition of further solvents and softening agents. The lacquer coatings have, in comparison with those of pure polyvinyl formate, an increased resistance to water.

(4) In a stirring vessel provided with a reflux condenser and a rapid stirring device there are heated to 90° C. 800 parts of a saturated sodium chloride solution to which 4 parts of hydrogen peroxide of 30 per cent. strength have been added. A mixture of 160 parts of vinyl chloracetate and 40 parts of crotonic acid methyl ester is caused to run into this solution. A very lively polymerisation sets in. The heterogeneous polymerisation product is obtained in a fine-pearly, uniform form. The product is filtered from the sodium chloride solution, washed and dried under reduced pressure. It is soluble in chlorinated hydrocarbons and esters.

(5) A mixture of 164 parts of vinyl acetate, 20 parts of crotonic acid ethyl ester, 16 parts of phthalic acid dimethyl ester and 1 part of dibenzoyl peroxide is heated to boiling in a suitable vessel provided with a reflux condenser. A very lively polymerisation sets in. After the reaction is complete, there is obtained a very viscous gummy product; this is particularly suitable as the intermediate layer for safety glass. When the mass is used for this purpose it is applied on glass plates, after having been diluted or not with a solvent and with application of heat and pressure. A second sheet of glass is then placed thereon.

(6) A mixture of 50 parts of vinyl acetate, 15 parts of crotonic acid, 0.5 part of acetaldehyde and 0.7 part of benzoyl peroxide is heated for 10 to 20 hours to 75° C. to 80° C. A solid, nearly limpid resin is obtained soluble in methanol, acetone, glycolformal, ethyl acetate, glacial acetic acid, but insoluble in methylene chloride, benzene, benzine. The product is likewise dissolved already in the cold in dilute aqueous solutions of caustic soda, ammonia, sodium carbonate whereby the corresponding salts of the interpolymerization product from vinyl acetate and crotonic acid are formed showing a strong foaming action. The free polymeric acid is reprecipitated by means of acids, for instance hydrochloric acid, in the form of white flakes. By heating with substances having an alkaline action saponification of the acetate groups occurs.

The interpolymerization of vinyl acetate with crotonic acid is not limited to the mutual quantitative proportion of the components mentioned above. Quite a similar product is, for instance, obtained if the proportion of the mixture is mol to mol.

(7) A mixture of 50 parts of vinyl acetate, 15 parts of beta-chlorcrotonic acid, 0.5 part of acetaldehyde and 0.7 part of benzoyl peroxide is heated to 70° C. to 80° C. as described in Example 6. The interpolymerization product is a resin soluble in methanol, acetone, methylene chloride, glycolformal, glacial acetic acid and insoluble in benzene or benzine. The product may likewise be dissolved in dilute aqueous ammonia whereby the ammonium salt of the interpolymerization product is formed having a strong foaming action; the polymeric acid may be reprecipitated by means of acids, for instance hydrochloric acid. If the solution of the interpolymerization product is allowed to stand with an excess of ammonia or if it is rapidly heated insoluble flakes separate.

Also in this example the quantitative proportion of the components is not limited as described above but may be varied in wide limits.

(8) A mixture of 72 parts of vinyl formate, 43 parts of crotonic acid and 3 parts of benzoyl peroxide is heated for 15 hours to 70° C. to 80° C. 1 part of benzoyl peroxide is then further added and the mixture is maintained for further 15 hours at 70° C. to 80° C. An interpolymerization product is formed soluble in acetone, glycolformal and glacial acetic acid but insoluble in methanol, ethanol, ethyl acetate and benzene. The interpolymerization product may be dissolved in dilute aqueous solutions of ammonia, sodium carbonate, alkali, with formation of the corresponding salts.

(9) A homogeneous mixture of 310 parts of vinyl stearate, 80 parts of crotonic acid, 2 parts of formic acid and 10 parts of benzoyl peroxide is heated for 20 hours to 70° C. to 80° C. and then for further 7 hours to 90° C. to 95° C. A very hard brittle interpolymerization product is obtained soluble in ethyl acetate, ether, methylenechloride, chloroform, carbon tetrachloride, benzene, petroleum ether and benzine but insoluble in methanol and ethanol. By boiling the product in a dilute aqueous solution of sodium carbonate the sodium salt of the interpolymerization product is obtained which only sparingly dissolves in water.

(10) A mixture of 90 parts of n-butoxy-acetic acid vinyl ester, 10 parts of crotonic acid and 1 part of benzoyl peroxide is heated for 15 hours to 70° C. to 80° C. 1 part of benzoyl peroxide is then further added and the whole is heated for 15 hours to 90° C. to 95° C. The soft resin obtained is soluble in methanol, ethanol, acetone, ethyl acetate, glacial acetic acid, glycolformal, methylene chloride and benzene but insoluble in benzine or petroleum ether. By heating it with an aqueous solution of sodium carbonate of 10 per cent. strength the sodium salt of the interpolymerization product is formed as a soapy mass soluble in water.

(11) A mixture of 122 parts of vinyl chloracetate, 43 parts of crotonic acid and 2 parts of benzoyl peroxide is polymerized by heating it to 70° C. to 80° C. A resin is obtained having similar properties as the interpolymerization product from vinyl acetate and crotonic acid.

(12) A mixture of 70 parts of vinyl acetate, 20 parts of vinyl stearate, 10 parts of crotonic acid, 0.25 part of formic acid and 1 part of benzoyl peroxide is heated for 15 to 20 hours to 70° C. to 80° C. A colorless, solid resin is formed soluble in methanol, ethanol, acetone, acetic acid ethyl ester, methylene chloride, glycolformal and in dilute aqueous solutions of ammonia, sodium carbonate and caustic soda solution.

(13) A mixture of 50 parts of vinyl butyrate, 15 parts of alpha-methyl-crotonic acid ethyl ester and 1 part of benzoyl peroxide is polymerized in 20 hours at 75° C. to 80° C. The polymerizate obtained is a highly viscous, colorless resin readily soluble in solvents for lacquers.

(14) A mixture of 50 parts of vinyl acetate, 15 parts of beta-methyl-crotonic acid methyl ester and 1 part of benzoyl peroxide is polymerized as described in the foregoing example. A product is obtained similar to that described in the foregoing example.

We claim:

The interpolymerization product obtained by polymerizing a mixture of 50 parts of vinyl acetate and 15 parts of crotonic acid in the presence of acetaldehyde and benzoylperoxide at temperatures of 75° C. to 80° C., said product being a solid, clear, colorless resin, soluble in methyl alcohol, acetone, acetic acid ethyl ester, glacial acetic acid and in dilute aqueous solutions of alkalies.

WERNER STARCK.
KURT BILLIG.